Sept. 26, 1961 R. C. WEBER 3,001,815
BUMPER ACTUATED VEHICLE SAFETY SEAT
Filed Feb. 25, 1958 2 Sheets-Sheet 1
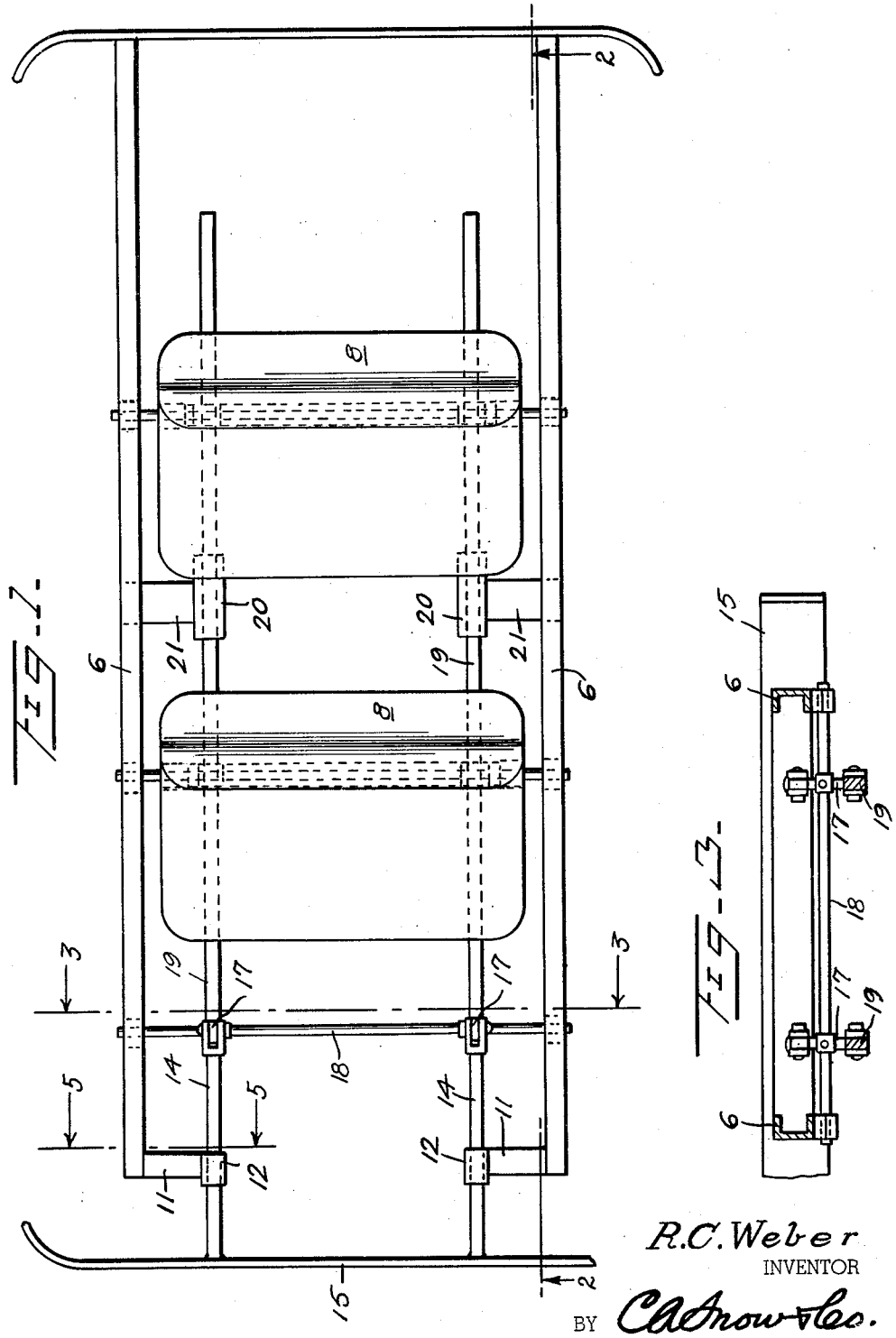
R.C. Weber
INVENTOR
BY C.A.Snow&Co.
ATTORNEYS.

Sept. 26, 1961 R. C. WEBER 3,001,815
BUMPER ACTUATED VEHICLE SAFETY SEAT
Filed Feb. 25, 1958 2 Sheets-Sheet 2
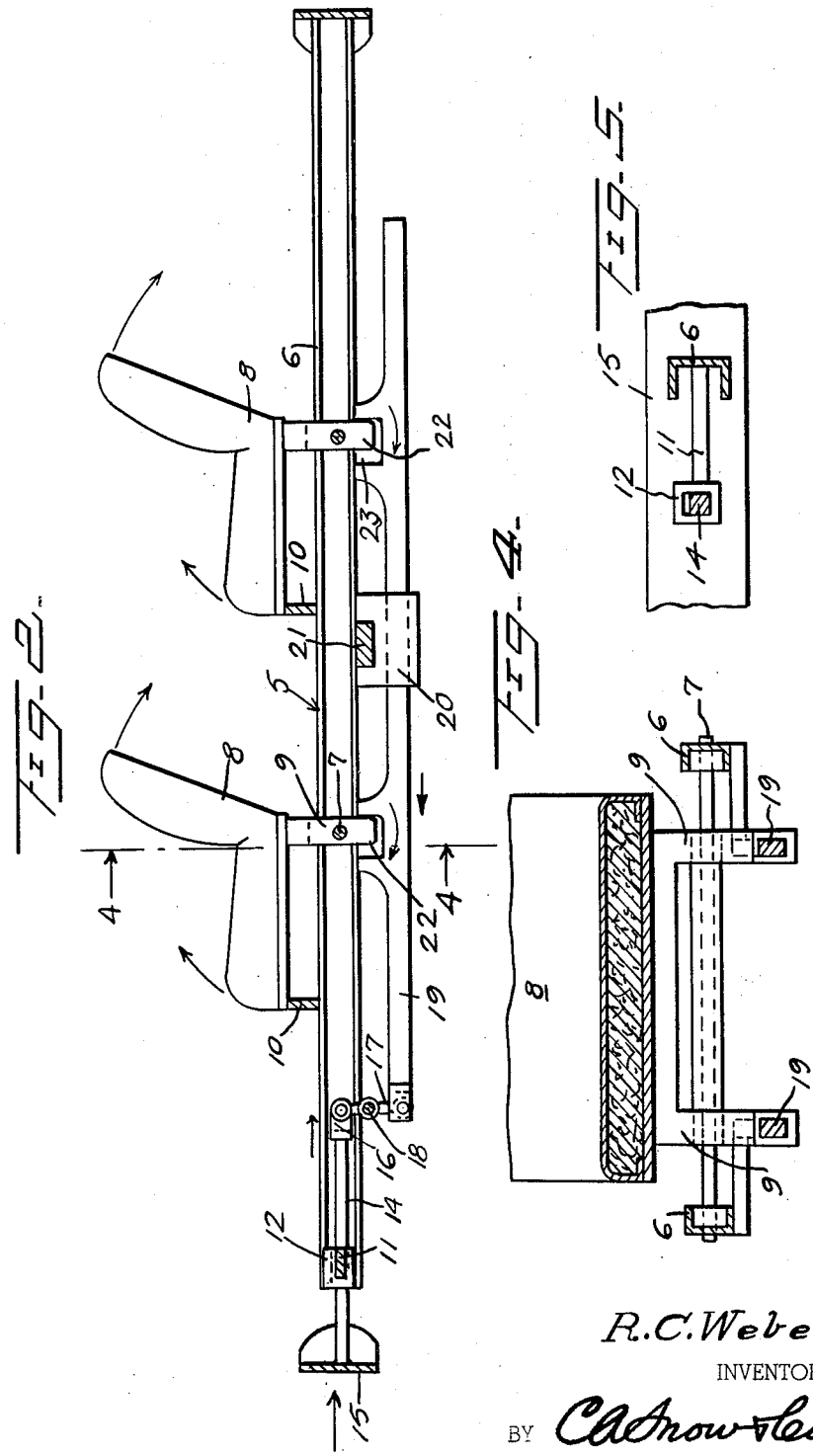
R.C. Weber
INVENTOR
BY C.A. Snow &Co.
ATTORNEYS.

3,001,815
BUMPER ACTUATED VEHICLE SAFETY SEAT
Robert C. Weber, 3429 Patrick St., Lake Charles, La.
Filed Feb. 25, 1958, Ser. No. 717,359
3 Claims. (Cl. 296—65)

This invention relates to motor vehicles, and more particularly to the seat construction thereof.

The primary object of the invention is to provide a motor vehicle seat which will pivot rearwardly under the impact caused when a vehicle equipped with the invention collides with another vehicle, thereby setting up resistance to the forward movement of the occupants of the vehicle seat caused by such impact, and which frequently causes the occupants of the vehicle to be catapulted from their seats, causing serious injury to the occupants.

Another object of the invention is to provide rearwardly pivoting seats together with mechanism operated by the rearward movement of the front bumper of the vehicle, caused by an impact directed to the bumper incident to the vehicle colliding with an object, resulting in an accident.

A further object of the invention is to provide a front bumper-actuated cushioning mechanism which will counteract impact force between colliding motor vehicles or stationary objects.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

FIGURE 1 is a plan view of a motor vehicle chassis, equipped with pivoted seats and a bumper actuating mechanism, in accordance with the present invention.

FIG. 2 is a sectional view taken substantially along the line 2—2 of FIG. 1 as viewed in the direction indicated by the arrows.

FIG. 3 is a sectional view taken on line 3—3 of FIGURE 1.

FIG. 4 is a sectional view taken on line 4—4 of FIG. 2.

FIG. 5 is a sectional view taken on line 5—5 of FIG. 1.

Referring to the drawings in detail, the chassis of a motor vehicle is indicated generally by the reference character 5 and includes side rails 6 of channel bar construction, the side rails 6 having their open sides disposed inwardly towards each other.

The reference character 7 indicates transversely extended rods that have their ends connected to the side rails 6, as better shown by FIGURE 1 of the drawings.

The seats of the motor vehicle are indicated generally by the reference character 8 and are provided with downwardly extended seat supporting bars 9 that are formed with openings through which the rods 7 extend, pivotally supporting the seats.

At the forward edge of each seat is a stop bar 10 which supports the forward edges of the seats.

At the forward ends of the side rails 6 of the chassis are inwardly extended arms 11 formed with tubular bearings 12 at their inner ends, through which the actuating rods 14 extend, the actuating rods 14 having their forward ends connected to the front bumper 15.

At the inner ends of the rods 14 are yokes 16 to which the upper ends of the links 17 are pivotally connected, links 17 being pivotally mounted on the transverse rod 18 that has its ends secured on the side rails 6 of the chassis, as shown by FIGURE 1 of the drawings. It is obvious from inspection of FIGS. 2 and 3 of the drawings that the link 17 is both supported, and therefore pivoted at a distance approximately midway between its hinging to the end of actuating rod 14 and the hinging to the forward end of side bars 19.

Mounted for sliding movement longitudinally of the side bars 6 of the chassis is an actuating mechanism comprising side bars 19 which operate through bearings 20 formed on the inner ends of the arms 21 that extend inwardly from the side rails of the chassis.

The side bars 19 are formed with U-shaped recess 22 in shoulders 23. As shown by FIG. 2 of the drawings, the lower ends of the seat supporting bars 9 extend below the lower edges of the side rails 6 of the chassis, and are disposed within the cut away portions and in normal contact with the rear shoulders of the cut away portions as shown by FIG. 2 of the drawings.

From the foregoing it will be seen that due to the construction shown and described, I have provided a means for tilting the seats of a motor vehicle rearwardly, automatically, by the operation of the bumper of the vehicle colliding with another vehicle or a stationary object. As the bumper strikes another object, it is obvious that the bumper will move rearwardly, causing the actuating rods 14 to move rearwardly, moving the lower ends of the links 17 and the connected side bars 19 forwardly, and as the shoulders 23 of the U-shaped recess 22 contact the lower ends of the seat supporting bars 9, the seats will be tilted rearwardly in the direction of the arrows as indicated by FIG. 2 of the drawings, thereby setting up resistance to the forward movement of the occupants of the vehicle seats caused by such impact, and which frequently causes the occupants of the vehicle to be catapulted from their seats.

It will of course be understood that when the seats tilt rearwardly, the shoulders 23 will contact the seat supporting bars 9 and restrict rearward tilting movement of the seats beyond a predetermined point.

Having thus described the invention, what is claimed is:

1. A motor vehicle comprising a chassis embodying side rails, a seat pivotally supported thereon, horizontally slidable actuating bars mounted on said vehicle chassis, a bumper slidably mounted on said chassis side rails, actuating mechanism pivotally connected between the forward ends of said bars and bumper for transmitting forward movement to said actuating bars upon rearward movement of said bumper caused by the impact of the bumper with an object, and means for transmitting movement of said bars to said seat, swinging said seat upwardly simultaneously with the movement of the horizontally slidable actuating bars.

2. A motor vehicle comprising a chassis embodying side rails, a bumper slidably mounted on said chassis side rails, a seat, vertical seat supporting bars secured to said seat, pivotally supported on said side rails, horizontally slidable actuating bars mounted on said side rails and having U-shaped recesses presenting shoulders, formed in the upper edges of said actuating bars, in which the lower ends of said vertical seat supporting bars extend, said seat supporting bars adapted to contact said shoulders for moving said seat supporting bars and seat, tilting said seat rearwardly upon forward movement of said actuating bars, and actuating mechanism connected between said bumper and actuating bars for moving said actuating bars forwardly upon rearward movement of said bumper, caused by impact.

3. A motor vehicle comprising a chassis embodying side rails, a bumper including actuating rods, slidably mounted on said side rails, a seat pivotally mounted on said chassis, a seat actuating mechanism including parallel actuating bars, bearings mounted on said chassis in which said actuating bars slide, vertical links swingably mounted on said side rails at points intermediate the ends of said vertical links, said actuating rods being connected to the upper ends of said links, the other ends of said links being connected to said parallel actuating bars, whereby rearward movement of said bumper, due to impact caused by collision of the bumper, moves said actuating bars forwardly, and means for transmitting movement of said actuating bars to said seat, tilting said seat rearwardly.

References Cited in the file of this patent

UNITED STATES PATENTS

| | | |
|---|---|---|
| 2,335,340 | Koppelman | Nov. 30, 1943 |

FOREIGN PATENTS

| | | |
|---|---|---|
| 777,343 | France | Nov. 26, 1934 |
| 913,288 | France | May 27, 1946 |
| 825,487 | Germany | Dec. 20, 1951 |